United States Patent
Clerckx et al.

(10) Patent No.: US 10,469,237 B2
(45) Date of Patent: Nov. 5, 2019

(54) METHOD AND APPARATUS FOR FEEDBACK IN MULTI-USER MULTIPLE-INPUT MULTIPLE-OUTPUT (MU-MIMO) COMMUNICATION SYSTEM

(71) Applicant: Samsung Electronics Co., Ltd., Suwon-si (KR)

(72) Inventors: Bruno Clerckx, Seoul (KR); Jun Il Choi, Seoul (KR); Ki Il Kim, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 19 days.

(21) Appl. No.: 15/714,815

(22) Filed: Sep. 25, 2017

(65) Prior Publication Data
US 2018/0076943 A1 Mar. 15, 2018

Related U.S. Application Data

(60) Division of application No. 14/599,388, filed on Jan. 16, 2015, now Pat. No. 9,800,388, which is a
(Continued)

(30) Foreign Application Priority Data

Feb. 10, 2011 (KR) .................. 10-2011-0011995

(51) Int. Cl.
*H04L 5/00* (2006.01)
*H04W 24/10* (2009.01)
(Continued)

(52) U.S. Cl.
CPC ......... *H04L 5/0057* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS

2006/0018397 A1  1/2006 Sampath et al.
2008/0233965 A1  9/2008 Kent et al.
(Continued)

FOREIGN PATENT DOCUMENTS

KR  10-2009-0088297 A  8/2009
WO  WO 2009/026769 A1  3/2009

OTHER PUBLICATIONS

ETSI TS 136 213 V8.8.0 (Oct. 2019) Technical Specification, LTE; Evolved Universal Terrestrial Radio Access (E-UTRA); Physical layer procedures (3GPP TS 36.213 version 8.8.0 Release 8) (Year: 2009).*

(Continued)

*Primary Examiner* — Jutai Kao
(74) *Attorney, Agent, or Firm* — The Farrell Law Firm, P.C.

(57) ABSTRACT

Provided is a feedback method and apparatus in a multiple-input multiple-output (MIMO) communication system. A terminal may determine a preferred pre-coding matrix for a neighboring terminal, based on a reference rank determined by a base station and a preferred pre-coding matrix of the terminal. The terminal may calculate a channel quality indicator (CQI) based on the preferred precoding matrix for the neighboring terminal, and may feed the CQI back to the base station.

9 Claims, 5 Drawing Sheets

Related U.S. Application Data continuation of application No. 13/248,166, filed on Sep. 29, 2011, now Pat. No. 8,948,104.

(60) Provisional application No. 61/407,070, filed on Oct. 27, 2010, provisional application No. 61/387,645, filed on Sep. 29, 2010.

(51) Int. Cl.

| | |
|---|---|
| *H04L 1/00* | (2006.01) |
| *H04L 25/03* | (2006.01) |
| *H04B 7/0456* | (2017.01) |
| *H04B 7/06* | (2006.01) |
| *H04B 7/0417* | (2017.01) |
| *H04B 7/0452* | (2017.01) |
| *H04W 72/04* | (2009.01) |

(52) U.S. Cl.
CPC ......... *H04B 7/0456* (2013.01); *H04B 7/0486* (2013.01); *H04B 7/065* (2013.01); *H04L 1/0026* (2013.01); *H04L 1/0031* (2013.01); *H04L 1/0036* (2013.01); *H04L 25/03343* (2013.01); *H04W 24/10* (2013.01); *H04W 72/0413* (2013.01); *H04B 7/063* (2013.01); *H04B 7/0632* (2013.01); *H04B 7/0639* (2013.01); *H04L 2025/03426* (2013.01); *H04L 2025/03802* (2013.01)

(56) References Cited

U.S. PATENT DOCUMENTS

| | | |
|---|---|---|
| 2009/0017769 A1 | 1/2009 | Chen et al. |
| 2009/0046594 A1 | 2/2009 | Zhou et al. |
| 2011/0034192 A1* | 2/2011 | Lim ................... H04B 7/0417 455/501 |
| 2011/0274099 A1 | 11/2011 | Kwon et al. |
| 2012/0314676 A1 | 12/2012 | Koo et al. |
| 2013/0089159 A1 | 4/2013 | Liu |

OTHER PUBLICATIONS

Chen, Runhua, et al. "Transmit Selection Diversity for Unitary Precoded Multiuser Spatial Multiplexing Systems with Linear Receivers," IEEE Transactions on Signal Processing. Mar. 2007, vol. 55. Issue 3; Abstract only.

Samsung, "Multi-component feedback for CQI enhancement," Proceedings from the 3GPP TSG RAN WG1 Meetinging #62, Xian, China, Oct. 11-15, 2010, Document No. R1-105379 (11 pages, in English).

International Search Report dated Feb. 29, 2012, directed to counterpart International Patent Application No. PCT/KR2011/007173; 3 pages.

Extended European Search Report dated Jan. 8, 2016, in counterpart European Application No. 11829586.4 (10 pages, in English).

\* cited by examiner

METHOD AND APPARATUS FOR FEEDBACK IN MULTI-USER MULTIPLE-INPUT MULTIPLE-OUTPUT (MU-MIMO) COMMUNICATION SYSTEM

CROSS-REFERENCE TO RELATED APPLICATION(S)

This application is a Divisional Application of U.S. application Ser. No. 14/599,388, filed Jan. 16, 2015, which is a Continuation Application of U.S. application Ser. No. 13/248,166, filed Sep. 29, 2011, which claims the benefit under 35 U.S.C. § 119(e) of a U.S. Provisional Application Nos. 61/387,645 and 61/407,070, filed on Sep. 29, 2010, and Oct. 27, 2010, respectively, in the U.S. Patent and Trademark Office, and the benefit under 35 U.S.C. § 119(a) of Korean Patent Application No. 10-2011-0011995, filed on Feb. 10, 2011, in the Korean Intellectual Property Office, the entire disclosures of which are incorporated herein by reference for all purposes.

BACKGROUND

1. Field

The following description relates to a method and apparatus for feedback in a multi-user multiple-input multiple-output (MIMO) communication system.

2. Description of Related Art

A multiple-input multiple-output (MIMO) communication system may use a plurality of channels in a spatial domain and may provide various multimedia services with high quality such as a voice service, a data service, and the like, in the wireless communication environment.

In the MIMO communication system, a base station and one or more terminals may share channel information, and may use a codebook to generate an optimal pre-coding matrix. For example, the base station and the terminals may share the channel information using codewords that are included in the codebook, and may generate a pre-coding matrix.

A space may be quantized to a plurality of codewords. The plurality of codewords generated by quantizing the space may be stored, as the codebook, in the base station and the terminals. For example, each codeword may be a vector or a matrix.

SUMMARY

In one general aspect, there is provided a communication method of a terminal in a multiple-input multiple-output (MIMO) communication system including a base station and the terminal, the method including receiving a reference rank determined by the base station, selecting a preferred first pre-coding matrix for the terminal, based on a preferred rank of the terminal, extracting at least one preferred second pre-coding matrix for at least one neighboring terminal corresponding to the preferred first pre-coding matrix, based on the reference rank and the preferred rank of the terminal, generating at least one channel quality indicator (CQI) of the terminal, based on the preferred first pre-coding matrix and the at least one preferred second pre-coding matrix, and feeding the at least one CQI back to the base station.

The extracting may include calculating a rank of the at least one neighboring terminal based on the reference rank and the preferred rank of the terminal, and extracting the at least one preferred second pre-coding matrix based on the rank of the at least one neighboring terminal.

The extracting may include extracting the at least one preferred second pre-coding matrix using a predetermined table which includes pairs of first pre-coding matrix candidates and second pre-coding matrix candidates.

The extracting may include extracting the at least one preferred second pre-coding that is orthogonal to the preferred first pre-coding matrix.

The generating may include generating the at least one CQI based on interference due to the at least one preferred second pre-coding matrix.

The selecting may include selecting the preferred first pre-coding matrix for the terminal based on a codebook corresponding to the preferred rank of the terminal.

The extracting may include extracting the at least one preferred second pre-coding matrix based on a codebook corresponding to the preferred rank of the terminal.

The extracting may include extracting the at least one preferred second pre-coding matrix based on a codebook corresponding to the reference rank.

The extracting based on the codebook corresponding to the reference rank may include selecting a codeword corresponding to the preferred first pre-coding matrix from a plurality of codewords that are included in the codebook corresponding to the reference rank, and determining the at least one preferred second pre-coding matrix based on the selected codeword.

The determining may include selecting, as the at least one preferred second pre-coding matrix, remaining columns excluding a column included in the preferred first pre-coding matrix from columns included in the selected codeword.

In another general aspect, there is provided a terminal in a multiple-input multiple-output (MIMO) communication system including a base station and the terminal, the terminal including a receiving unit configured to receive a reference rank determined by the base station, a first pre-coding matrix selecting unit configured to select a preferred first pre-coding matrix for the terminal, based on a preferred rank of the terminal, a second pre-coding matrix extracting unit configured to extract at least one preferred second pre-coding matrix for at least one neighboring terminal corresponding to the preferred first pre-coding matrix, based on the reference rank and the preferred rank of the terminal, a CQI generating unit configured to generate at least one channel quality indicator (CQI) of the terminal, based on the preferred first pre-coding matrix and the at least one preferred second pre-coding matrix, and a transmitting unit configured to feed the at least one CQI back to the base station.

The second pre-coding matrix extracting unit may calculate a rank for the at least one neighboring terminal based on the reference rank and the preferred rank of the terminal, and may extract the at least one preferred second pre-coding matrix using the at least one neighboring terminal.

The terminal may further include a memory configured to store a predetermined table including pairs of first pre-coding matrix candidates and second matrix pre-coding matrix candidates, and the second pre-coding matrix extracting unit may extract the at least one preferred second pre-coding matrix based on the table.

The CQI generating unit may generate the at least one CQI based on interference due to the at least one preferred second pre-coding matrix.

The first pre-coding matrix selecting unit may select the preferred first pre-coding matrix for the terminal, based on a codebook corresponding to the preferred rank of the terminal.

The second pre-coding matrix extracting unit may extract the at least one preferred second pre-coding matrix, based on a codebook corresponding to the preferred rank of the terminal or a codebook corresponding to the reference rank.

Example embodiments may provide a terminal that may determine a preferred pre-coding matrix for a neighboring terminal, based on a reference rank determined by a base station and a precoding matrix of the terminal, may calculate a CQI of the terminal based on the preferred pre-coding matrix for the neighboring terminal, and may feed the CQI back to the base station. The base station may flexibly schedule terminals, and the CQI may be more accurately predicted in the MIMO communication system.

In another aspect, there is provided a terminal in a multiple-input multiple-output (MIMO) communication system, the terminal including a receiver configured to receive a reference rank of the terminal from a base station, a controller configured to determine a preferred rank of the terminal and to determine information to feed back to the base station based on the reference rank of the terminal and the preferred rank of the terminal, and a transmitter configured to transmit the determined feedback information to the base station.

In response to the preferred rank of the terminal being greater than the reference rank of the terminal, the controller may determine to transmit feedback information comprising a rank indicator (RI) indicating a preferred rank that is restricted to being less than or equal to the reference rank, a pre-coding matrix indicator (PMI) indicating a preferred codeword selected by the terminal, and at least one channel quality indicator (CQI) of the terminal.

In response to the preferred rank of the terminal being less than the reference rank of the terminal, the controller may determine to transmit feedback information comprising a best companion channel quality indicator (CQI) comprising information that is associated with interference of at least one neighboring terminal.

In response to the preferred rank of the terminal being the same as the reference rank of the terminal, the controller may determine not to transmit feedback information to the base station.

Other features and aspects may be apparent from the following detailed description, the drawings, and the claims.

Figure 1:
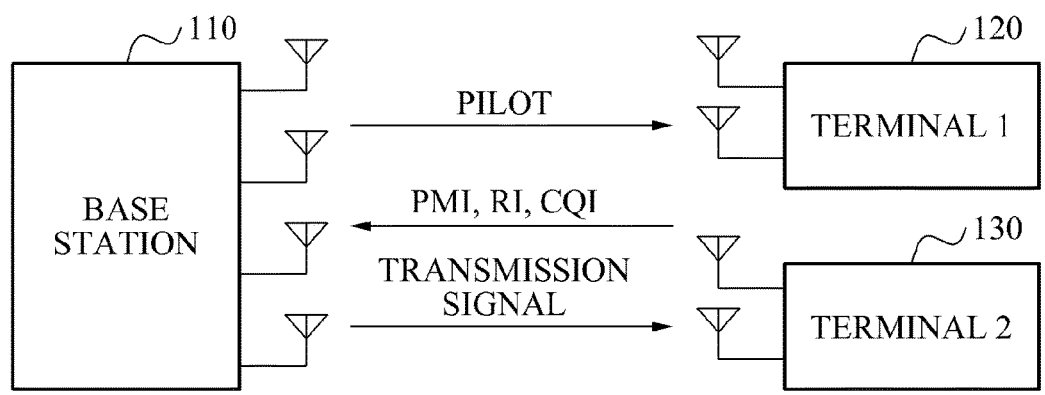
FIG. 1 is a diagram illustrating an example of a closed-loop multiple-input multiple-output (MIMO) communication system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a closed-loop multiple-input multiple-output (MIMO) communication system.

Referring to FIG. 1, the closed-loop MIMO communication system includes a base station 110 and terminals 120 and 130. The example of FIG. 1 is an example of a multi-user MIMO communication system. It should be appreciated that the examples herein are also applicable to a single user MIMO (SU-MIMO) communication system. In the closed-loop, a terminal 120 and a terminal 130 may feed channel information back to the base station 110. The base station 110 may perform pre-coding based on the channel information that is fed back from the terminals.

The base station 110 may include a plurality of transmission antennas, for example, two transmission antennas, four transmission antennas, eight transmission antennas, and the like. The terminal 120 and 130 may include at least one reception antenna. A channel may be formed between the base station 110 and the terminal 120, and a channel may be formed between the base station 110 and the terminal 130. In this example, the terminal 120 and the terminal 130 may feed back information that is associated with a respective channel to the base station 110. Based on the information associated with the channels that is fed back, the base station 110 may transmit a signal to the terminals 120 and 130 to increase or improve performance of the system.

Figure 2:
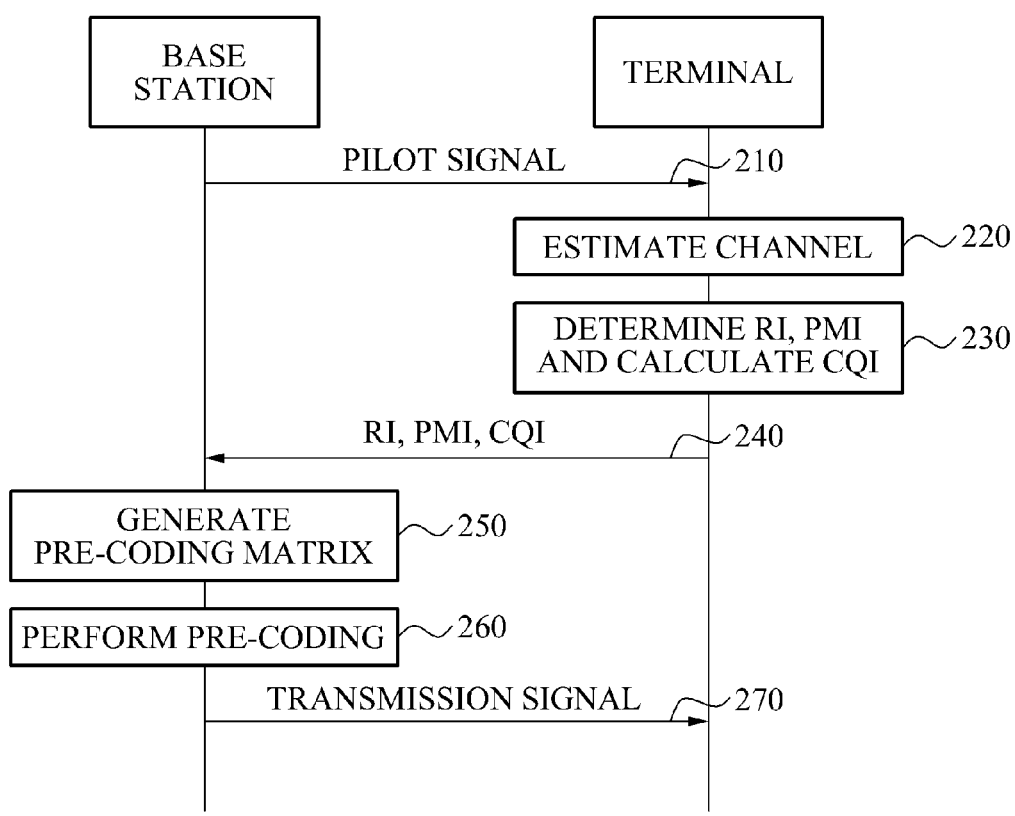
FIG. 2 is a flowchart illustrating an example of communication between a base station and a terminal in a closed-loop MIMO communication system.

FIG. 2 illustrates an example of communication between a base station and a terminal in a closed-loop MIMO communication system.

It should be appreciated that the base station may operate in conjunction with a plurality of terminals in a closed-loop MIMO system, however, an operation between the base station and a single terminal is described for ease of description.

Referring to FIG. 2, the base station transmits a pilot signal to the terminal, in 210. For example, the pilot signal may be a signal that is known by both the base station and the terminal. The terminal estimates a channel between the base station and the terminal based on the pilot signal transmitted from the base station, in 220. For example, channel information that is obtained by estimating the channel may include a channel matrix H and/or a channel covariance matrix $H^H H$.

Based on the channel matrix or the channel covariance matrix $H^H H$, the terminal determines a pre-coding matrix indicator (PMI) of the terminal and a preferred rank indicator (RI) of the terminal, and calculates a channel quality indicator (CQI) of the terminal, in 230.

The PMI is an indicator indicating a preferred codeword selected by the terminal from codewords that are included in a codebook. For example, each of the codewords may be expressed as a matrix, and the preferred codeword selected by the terminal may be a pre-coding matrix candidate recommended to the base station. A matrix includes one or more rows and one or more columns. If the matrix includes a single row or a single column, the matrix may be referred to as a vector. The RI is an indicator indicating a preferred rank of the terminal that may be determined based on one or more channel conditions.

The terminal feeds back the channel information, such as the RI, the PMI, and the CQI, to the base station, in 240, such that the base station may obtain the channel information.

The base station generates an optimal pre-coding matrix based on the channel information that is fed back, in 250. The base station performs pre-coding of data streams to be transmitted, based on the pre-coding matrix, in 260. The pre-coded data streams are transmitted to the terminal, in 270.

In the closed-loop MIMO communication system of FIG. 2, the PMI, RI, and CQI that are fed back may be obtained without taking into account a neighboring terminal scheduled with the terminal and interference due to the neighboring terminal. The PMI, RI, and the CQI may be channel information that is appropriate for a single user, that is, an SU-MIMO communication system. Hereinafter, the PMI, the RI, and the CQI may be referred to as an SU-MIMO PMI, an SU-MIMO RI, and an SU-MIMO CQI, respectively. The feedback of the channel information, such as the SU-MIMO PMI, the SU-MIMO RI, and the SU-MIMO CQI, may be referred to as an SU-MIMO report.

The base station may support an MU-MIMO scheme based on the SU-MIMO report. In this example, the single user information is obtained without taking into account interference between terminals, thus, performance may be deteriorated.

Therefore, additional channel information associated with the neighboring terminal may be provided, for a dynamic switching between the SU-MIMO scheme and an MU-MIMO scheme. Feedback of the additional channel information may be referred to as an MU-MIMO report. Two examples for the dynamic switching between the SU-MIMO scheme and the MU-MIMO scheme are described.

1. Rank Restricted Feedback Mode

In the example of the rank restricted feedback mode, a terminal may perform an SU-MIMO report in a restricted rank. When an SU-MIMO scheme is assumed to be used, feedback of a PMI, a CQI, and an RI with respect to a rank 1 and a rank 2 may be used to generate pre-coding information and to predict a CQI when multiple users are scheduled. For example, i) an SU-MIMO report without rank restriction and ii)an SU-MIMO report with a restricted rank for improving performance of an MU-MIMO scheme may be time-multiplexed. As an example, i) the SU-MIMO report without rank restriction may be performed based on a shorter term period, and ii) the SU-MIMO report with the restricted rank may be performed based on a longer term period.

2. Best Companion COI Mode

Feedback of a best companion CQI may be used to provide improved feedback for an MU-MIMO scheme. A best companion PMI may inform a base station of information that is associated with a null-space with respect to a predetermined terminal. The information may be used when the base station generates an MU-MIMO pre-coding matrix.

The best companion CQI may indicate interference between terminals with respect to a given number of interference layers, based on the assumption that a pre-coding matrix corresponding to the best companion PMI is used as a pre-coding matrix for interference layers or interference terminals. If a plurality of best companion PMIs exists, a plurality of best companion CQIs may also exist.

A terminal may transmit an additional PMI to more additionally explain a signal space, in comparison to transmitting an additional PMI, such as the best companion PMI indicating the null space.

In various examples, the pre-coding matrix corresponding to the best companion PMI may be orthogonal to a preferred pre-coding matrix. The best companion CQI may be calculated based on the assumption that the terminals are allocated to orthogonal pre-coders. The best companion CQI calculated in this example may be referred to as a unitary pre-coding CQI or a per user unitary rate control (PU2RC) CQI.

In this example, the best companion PMI may not be fed back and only the best companion CQI may be fed back. According to an example embodiment, an additional best companion CQI that is obtained by assuming an RI, a PMI, and a CQI of a basic SU-MIMO report, and the orthogonal precoder to be used may each be fed back.

In the two methods, the CQI may be calculated by assuming a predetermined transmission rank expressed as a reference rank to be used, that is, by assuming a number of layers expected to be transmitted by the base station. The reference rank may be determined by the base station. Information associated with the reference rank may be transmitted from the base station to the terminal using a downlink channel so that terminal may feed back appropriate information.

According to the two example methods, the base station i) may perform flexible scheduling, and ii) may more accurately predict a CQI when multiple users are scheduled.

An example of a method of applying the two methods to a unified framework and a method of feeding above described information back over a control channel are further described herein. A method of the terminal that calculates the best companion CQI and a process thereof is further described herein.

Feedback Relying on Reference Rank and Preferred Rank of Terminal

Figure 3:
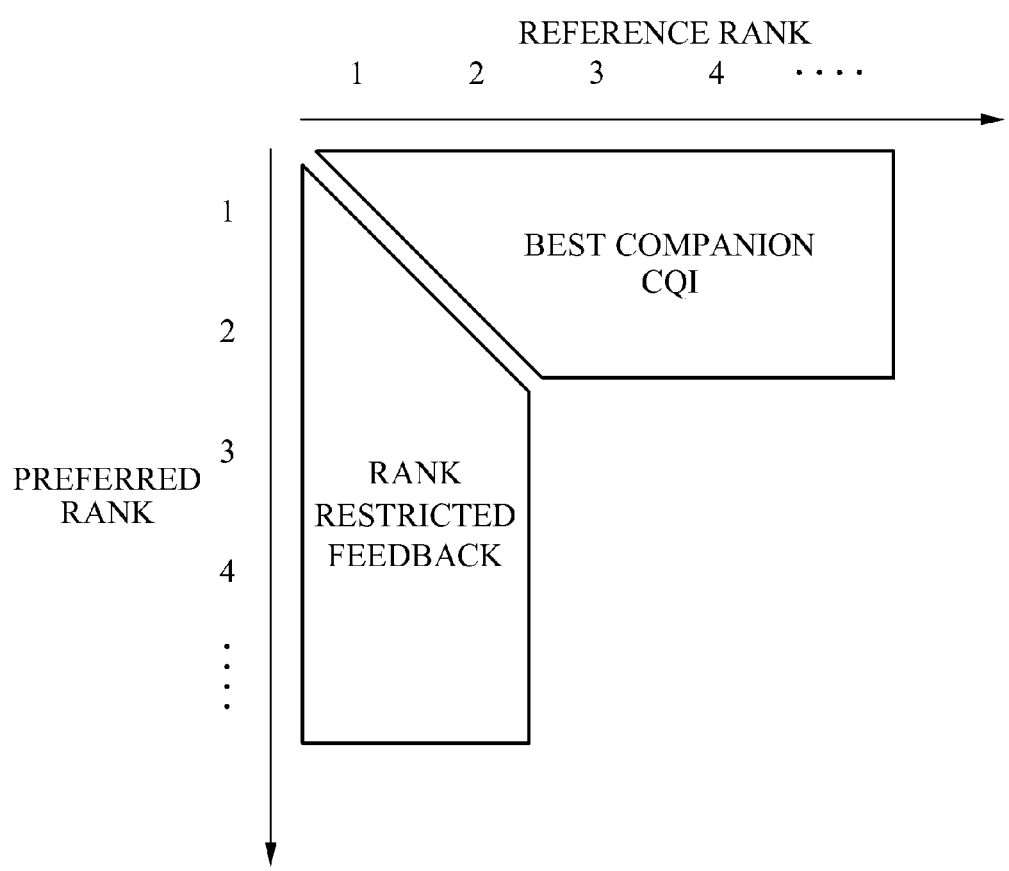
FIG. 3 is a diagram illustrating an example of a feedback method based on a reference rank and a preferred rank of a terminal.

FIG. 3 illustrates an example of a feedback method based on a reference rank and a preferred rank of a terminal.

Referring to FIG. 3, the two methods described in the example of FIG. 2, which are referred to as the rank restricted feedback mode and the best companion CQI mode, may be applied to different scenarios.

The rank restricted feedback mode may be applied to a case in which the preferred rank of the terminal is greater than or equal to the reference rank. The best companion CQI mode may be applied to a case in which the reference rank is greater than or equal to the preferred rank of the terminal.

The rank restricted feedback may be used to show that a preferred pre-coding matrix corresponding to an SU-MIMO PMI may quantize a wide space, and columns of the preferred pre-coding matrix may not need to accurately approximate a dominant eigenvector of a space.

A best companion QCI and a best companion PMI may be applied to a scenario in which a terminal is scheduled together with neighboring terminals. The terminal may include information that is associated with interference in the best companion CQI, by approximating an interference precoder.

Statistically, the best companion PMI may be orthogonal to the SU-MIMO PMI and thus, the best companion PMI may not be fed back. In this example, the best companion CQI that is obtained on the assumption that orthogonal pre-coders are used may be fed back.

Therefore, if the preferred rank of the terminal is less than the reference rank (best companion CQI mode), an additional PMI may not be fed back. However, if the preferred rank of the terminal is greater than the reference rank (rank restricted feedback mode), the additional PMI may be fed back.

According to an example embodiment, the type of information fed back by the terminal may vary based on i) the preferred rank of the terminal and ii) the reference rank.

For example, if the preferred rank of the terminal is greater than the reference rank (rank restricted feedback mode), the terminal may feed back i) a rank indicator corresponding to a preferred rank that is restricted to being less than or equal to the reference rank, ii) a PMI, and iii) at least one CQI relaying on a number of codewords. While the feedback is similar to an SU-MIMO report, the feedback includes a feature that the preferred rank is less than or equal to the reference rank.

As another example, if the preferred rank of the terminal is less than the reference rank (best companion CQI mode), the terminal may feed at least one best companion CQI back to a base station, on the assumption that pre-coding matrices used for scheduling of terminals are orthogonal to each other.

As another example, if the preferred rank of the terminal is equal to the reference rank, the terminal may not perform an MU-MIMO report.

Best Companion COI

As described herein, the best companion CQI may describe MU-MIMO interference that is obtained based on the assumption that the orthogonal pre-coders are used. With respect to each of a preferred rank of a terminal and a reference rank, an example of a method of calculating the best companion CQI is described.

<A Case in Which a Base Station Includes Four Antennas (4Tx)>

To calculate the best companion CQI, the terminal may use several best companion PMIs. For example, the terminal may calculate a receive filter based on the given best companion PMIs and an SU-MIMO PMI that is a preferred PMI of the terminal, and may calculate the best companion CQI based on interference that is generated due to the best companion PMIs. Two examples of methods of determining the best companion PMI and an example of a method of calculating the best companion CQI are described herein.

When the base station uses the four antennas, a pre-coding matrix W may be selected from Table 1 or from a subset of Table 1. For example, Table 1 may be a codebook that is used when the base station uses four antennas in a 3GPP LTE system. When the system is changed, the codebook may be changed. However, a general process may be the same. $W_n^{\{s\}}$ is a matrix defined by columns given, by a set $\{s\}$, from $W_n = I - 2u_n u_n^H / u_n^H u_n$. I denotes a 4×4 unit matrix and $u_n$ is given in Table 1.

TABLE 1

| Codebook index | $u_n$ | Number of layers v | | | |
|---|---|---|---|---|---|
| | | 1 | 2 | 3 | 4 |
| 1 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 2 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 3 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 4 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 5 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 6 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 7 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 8 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 9 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 10 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 11 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 12 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 13 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 14 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 15 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 16 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

<Best Companion PMI Determining Method 1>

In the method 1, the best companion PMI may be selected from a codebook corresponding to a rank 1, that is, from a rank 1 codebook.

1. preferred rank of terminal=1

Codewords corresponding to an index 1 through an index 4 may be mutually orthogonal. Codewords corresponding to index 1 through index 4 may be pre-coding matrices in a 4Tx LTE codebook, that is, an LTE codebook for a case in which the base station includes four antennas. The same principle may be applied to codewords corresponding to an index 5 through an index 8, codewords corresponding to an index 9 through an index 12, and codewords corresponding to an index 13 through an index 16. Accordingly, 16 vectors corresponding to the codewords may be classified into four sets associated with orthogonal vectors.

(1) reference rank=2

Best companion PMI candidates to be used for calculating the best companion CQI may be defined for each of rank 1 SU-MIMO PMIs.

For example, the best companion PMI candidates may be defined as shown in Table 2.

TABLE 2

| Codeword index(=SU-MIMO PMI) | 1 | 2 | 3 | 4 |
|---|---|---|---|---|
| Best companion PMI candidate 1 | 3 | 4 | 1 | 2 |
| Best companion PMI candidate 2 | 4 | 3 | 2 | 1 |
| Best companion PMI candidate 3 | 2 | 1 | 4 | 3 |

Referring to Table 2, if a codeword index corresponding to the SU-MIMO PMI is 1, a best companion PMI candidate 1 is 3. The terminal may calculate the best companion CQI based on the assumption that a pre-coding matrix of the base station is [PMI_1, PMI_3], and on the assumption that a layer corresponding to PMI_3 is an interference layer and a layer corresponding to the PMI_1 is a signal layer. In this example, PMI_n denotes a codeword corresponding to an index n.

Examples of the best companion PMI candidates with respect to a codeword index 5 through a codeword index 16 are organized in Table 3 through Table 5.

TABLE 3

| Codeword index | 5 | 6 | 7 | 8 |
|---|---|---|---|---|
| Best companion PMI candidate 1 | 8 | 7 | 6 | 5 |
| Best companion PMI candidate 2 | 7 | 8 | 5 | 6 |
| Best companion PMI candidate 3 | 6 | 5 | 8 | 7 |

TABLE 4

| Codeword index | 9 | 10 | 11 | 12 |
|---|---|---|---|---|
| Best companion PMI candidate 1 | 11 | 12 | 9 | 10 |
| Best companion PMI candidate 2 | 12 | 11 | 10 | 9 |
| Best companion PMI candidate 3 | 10 | 9 | 12 | 11 |

TABLE 5

| Codeword index | 13 | 14 | 15 | 16 |
|---|---|---|---|---|
| Best companion PMI candidate 1 | 16 | 15 | 14 | 13 |
| Best companion PMI candidate 2 | 15 | 16 | 13 | 14 |
| Best companion PMI candidate 3 | 14 | 13 | 16 | 15 |

A table including a pair of codeword indices corresponding to the SU-MIMO PMI and a best companion PMI may be obtained based on combinations of the best companion PMI candidates of Table 1 through Table 5. An example of the obtained tables is provided as Table 6.

TABLE 6

| | Codeword index | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Best companion PMI | 3 | 4 | 1 | 2 | 7 | 8 | 5 | 6 | 12 | 11 | 10 | 9 | 14 | 13 | 16 | 15 |

The terminal may feed back best companion CQIs with respect to all candidates. In this example, even though feedback overhead increases, a dynamic switching between an SU-MIMO scheme and an MU-MIMO scheme may be improved.

According to another example, the terminal may feed back a single best companion CQI that is obtained based on an average of all best companion PMI candidates of the best companion CQIs. For example, if the SU-MIMO PMI is 1, the terminal may feed back a best companion CQI that is obtained as an average of three best companion CQIs such as a best companion CQI that has a best companion PMI of 2, a best companion CQI that has a best companion PMI of 3, and a best companion CQI that has a best companion PMI of 4.

(2) reference rank=3

Two best companion PMI candidates to be used for calculating the best companion CQI may be defined with respect to each rank 1 SU-MIMO PMI.

For example, the best companion PMI candidates may be defined as shown in Table 7.

TABLE 7

| Codeword index | 1 | 2 | 3 | 4 |
|---|---|---|---|---|
| Best companion PMI candidate 1 | 2, 3 | 3, 4 | 4, 1 | 2, 3 |
| Best companion PMI candidate 2 | 3, 4 | 4, 1 | 1, 2 | 3, 1 |
| Best companion PMI candidate 3 | 4, 2 | 1, 3 | 2, 4 | 1, 2 |

Referring to Table 7, if a codeword index corresponding to the SU-MIMO PMI is 1, the best companion PMI candidate 1 is 2 and 3. The terminal may calculate the best companion CQI, based on the assumption that a pre-coding matrix of the base station is [PMI_1, PMI_2, PIM_3], and based on the assumption that a layer corresponding to PMI_2 and PMI_3 is an interference layer and a layer corresponding to PMI_1 is a signal layer.

The best companion PMI candidates with respect to a codeword index 5 through a codeword index 16 may be organized as shown in Table 8 through Table 10.

TABLE 8

| Codeword index | 5 | 6 | 7 | 8 |
|---|---|---|---|---|
| Best companion PMI candidate 1 | 6, 7 | 7, 8 | 8, 5 | 5, 6 |
| Best companion PMI candidate 2 | 7, 8 | 8, 5 | 5, 6 | 6, 7 |
| Best companion PMI candidate 3 | 8, 6 | 5, 7 | 6, 8 | 7, 5 |

TABLE 9

| Codeword index | 9 | 10 | 11 | 12 |
|---|---|---|---|---|
| Best companion PMI candidate 1 | 10, 11 | 11, 12 | 12, 9 | 9, 10 |
| Best companion PMI candidate 2 | 11, 12 | 12, 9 | 9, 10 | 10, 11 |
| Best companion PMI candidate 3 | 12, 10 | 9, 11 | 10, 12 | 11, 9 |

TABLE 10

| Codeword index | 13 | 14 | 15 | 16 |
|---|---|---|---|---|
| Best companion PMI candidate 1 | 14, 15 | 15, 16 | 16, 13 | 13, 14 |
| Best companion PMI candidate 2 | 15, 16 | 16, 13 | 13, 14 | 14, 15 |
| Best companion PMI candidate 3 | 16, 14 | 13, 15 | 14, 16 | 15, 13 |

A table including a pair of a codeword indices corresponding to the SU-MIMO PMI and two best companion PMI candidates may be obtained based on combinations of the best companion PMI candidates as shown in Table 7 through Table 10.

(3) reference rank=4

Three best companion PMI candidates to be used for calculating the best companion CQI may be defined with respect to each rank 1 SU-MIMO PMI.

For example, the best companion PMI candidates may be defined as shown in Table 11 through Table 14.

TABLE 11

| Codeword index | 1 | 2 | 3 | 4 |
|---|---|---|---|---|
| Best companion PMI candidate 1 | 2, 3, 4 | 3, 4, 1 | 4, 1, 2 | 1, 2, 3 |

TABLE 12

| Codeword index | 5 | 6 | 7 | 8 |
|---|---|---|---|---|
| Best companion PMI candidate 1 | 6, 7, 8 | 7, 8, 5 | 8, 5, 6 | 5, 6, 7 |

TABLE 13

| | Codeword index | | | |
|---|---|---|---|---|
| | 9 | 10 | 11 | 12 |
| Best companion PMI candidate 1 | 10, 11, 12 | 11, 12, 9 | 12, 9, 10 | 9, 10, 11 |

TABLE 14

| | Codeword index | | | |
|---|---|---|---|---|
| | 13 | 14 | 15 | 16 |
| Best companion PMI candidate 1 | 14, 15, 16 | 15, 16, 13 | 16, 13, 14 | 13, 14, 15 |

A table including a pair of a codeword indices corresponding to the SU-MIMO PMI and three PMIs may be obtained based on combinations of the best companion PMI candidates in Table 1 through Table 14.

—Power Allocation—

When the terminal calculates a CQI, it is assumed that the terminal allocates different powers to each codeword. For example, if the reference rank is equal to 4, the terminal may allocate 1/2 total power to the 1 SU-MIMO PMI, and may allocate 1/6 total power to each of remaining best companion PMIs. An example of candidates for power allocation may be as follows.

[power of rank 1 SU-MIMO PMI/power of best companion PMI/power of best companion PMI/power of best companion PMI]=[1/2/1/6/1/6/1/6] or [1/2/1/2/0/0] or [1/2/0/1/2/0] or [1/2/0/0/1/2] or [1/4/1/4/1/4/1/4]

—Best Companion CQI—

The terminal may generate a matrix Vg=[a codeword corresponding to the SU MIMO PMI, codewords corresponding to the best companion PMIs]. The matrix Vg may be generated based on the SU-MIMO PMI and the best companion PMI. The terminal may assume that a first column of the matrix Vg is to be a pre-coding matrix for the terminal, and the remaining columns of the matrix Vg are to be interference pre-coding matrices. The terminal may calculate the best companion COI as a signal-to-interference plus noise ratio (SINR). The first column of the matrix Vg may be a first column of a codeword corresponding to the SU-MIMO PMI and the remaining columns of the matrix Vg may be remaining columns of the codeword corresponding to the SU-MIMO PMI and codewords corresponding to the best companion PMIs. For example if the reference rank is R, the best companion CQI with respect to a terminal k may be calculated by Equation 1.

$$\text{best companion } CQI = \text{SINR}(V_g)_{k,l} = \frac{|b^H H_k V_g(1)|^2}{\sum_{l=1, l \neq 1}^{R} |b^H H_k V_g(l)|^2 + \frac{R}{P}\|b\|^2}$$ [Equation 1]

In this example, b denotes a receive beamforming vector, such as an MMSE, and the matrix Vg(m) denotes an $m^{th}$ column vector of the unitary matrix Vg. Also, P denotes a total transmission power. In this example, it is assumed that same amount of power is allocated to the streams.

2. preferred rank of terminal=2

If the preferred rank of the terminal is equal to 2, and the terminal is capable of performing an SU-MIMO report including two CQIs with respect to each layer and a single PMI, the terminal may be scheduled in a rank 2 SU-MIMO, in an MU-MIMO with respect to a single layer, or in an MU-MIMO with respect to two layers.

As an example, if the base station includes four antennas, the terminal may be scheduled in the MU-MIMO with respect to the single layer, based on a column of a codeword with respect to a PMI corresponding to a highest CQI.

Accordingly, if codewords with respect to the best companion PMIs are orthogonal to the column of the codeword with respect to the PMI corresponding to the highest CQI, the best companion CQI may describe a CQI of a layer corresponding to the column of the codeword with respect to the PMI corresponding to the highest CQI.

For example, a first column of a codeword with respect to a rank 2 PMI in a 4Tx LTE codebook corresponding to a rank 2 may be the same as a codeword with respect to a rank 1 PMI in a codebook corresponding to a rank 1. In this example, best companion PMI candidates to be used for the first column of the codeword with respect to the rank 1 PMI may be expressed using a table for a case in which the preferred rank of the terminal is 1.

(1) reference rank=3

Best companion PMI candidates of a case in which a second column of a codeword with respect to a rank 2 PMI has a highest CQI are organized as shown in Table 15 and Table 16.

TABLE 15

| | Rank 2 codeword index | | | |
|---|---|---|---|---|
| | 1 | 2 | 3 | 4 |
| codeword index of rank 1 codebook same as second column of rank 2 codeword | 11 | 10 | 11 | 12 |
| best companion PMI candidate 1 in rank 1 codebook | 12, 9 | 11, 12 | 12, 9 | 9, 10 |
| best companion PMI candidate 2 in rank 1 codebook | 9, 10 | 12, 9 | 9, 10 | 10, 11 |
| best companion PMI candidate 3 in rank 1 codebook | 10, 12 | 9, 11 | 10, 12 | 11, 9 |

TABLE 16

| | Rank 2 codeword index | | | |
|---|---|---|---|---|
| | 5 | 6 | 7 | 8 |
| codeword index of rank 1 codebook same as second column of rank 2 codeword | | | 5 | 6 |
| best companion PMI candidate 1 in rank 1 codebook | 5, 7 | 6, 8 | 6, 7 | 7, 8 |

TABLE 16-continued

|  | Rank 2 codeword index | | | |
| --- | --- | --- | --- | --- |
|  | 5 | 6 | 7 | 8 |
| best companion PMI candidate 2 in rank 1 codebook |  |  | 7, 8 | 8, 5 |
| best companion PMI candidate 3 in rank 1 codebook |  |  | 8, 6 | 5, 7 |

Referring to Table 16, a best companion PMI corresponding to a second column of a codeword corresponding to the rank 2 codeword index 5 may be PMI_5 and PMI_7 in the rank 1 codebook. The best companion PMIs may be mutually orthogonal. Another PMI candidate that is orthogonal to the second column of the codeword corresponding to the rank 2 codeword index 5 does not exist in the rank 1 codebook.

When non-orthogonal best companion PMI is used, a number of best companion PMI candidates may increase.

For example, the second column of the codeword corresponding to the rank 2 codeword index 5 may have a relatively low correlation with PMIs corresponding to indexes 1, 2, 9, 10, 11, and 12 of the rank 1 codebook.

A second column of a codeword corresponding to a rank 2 codeword index 6 may have a relatively low correlation with PMIs corresponding to indexes 2, 3, 10, 11, 13, and 16 of the rank 1 codebook.

Accordingly, Table 17 is obtained by adding, to Table 16, PMI candidates having relatively low correlation.

TABLE 17

|  | Rank 2 codeword index | | | |
| --- | --- | --- | --- | --- |
|  | 5 | 6 | 7 | 8 |
| codeword index of rank 1 codebook same as second column of rank 2 codeword |  |  | 5 | 6 |
| best companion PMI candidate 1 in rank 1 codebook | 5, 7 | 6, 8 | 6, 7 | 7, 8 |
| best companion PMI candidate 2 in rank 1 codebook | 1, 2 | 2, 3 | 7, 8 | 8, 5 |
| best companion PMI candidate 3 in rank 1 codebook | 9, 10 | 10, 11 | 8, 6 | 5, 7 |
| best companion PMI candidate 4 in rank 1 codebook | 11, 12 | 13, 16 |  |  |

Best companion PMI candidates with respect to remaining rank 2 codeword indexes are organized as shown in Table 18 and Table 19.

TABLE 18

|  | Rank 2 codeword index | | | |
| --- | --- | --- | --- | --- |
|  | 9 | 10 | 11 | 12 |
| codeword index of rank 1 codebook same as second column of rank 2 codeword | 1 | 4 | 9 | 10 |
| best companion PMI candidate 1 in rank 1 codebook | 2, 3 | 2, 3 | 10, 11 | 11, 12 |
| best companion PMI candidate 2 in rank 1 codebook | 3, 4 | 3, 1 | 11, 12 | 12, 9 |
| best companion PMI candidate 3 in rank 1 codebook | 4, 2 | 1, 2 | 12, 10 | 9, 11 |

TABLE 19

|  | Rank 2 codeword index | | | |
| --- | --- | --- | --- | --- |
|  | 13 | 14 | 15 | 16 |
| codeword index of rank 1 codebook same as second column of rank 2 code word | 14 | 16 | 13 | 15 |
| best companion PMI candidate 1 in rank 1 codebook | 15, 16 | 13, 14 | 14, 15 | 16, 13 |
| best companion PMI candidate 2 in rank 1 codebook | 16, 13 | 14, 15 | 15, 16 | 13, 14 |
| best companion PMI candidate 3 in rank a codebook | 13, 15 | 15, 13 | 16, 14 | 14, 16 |

A table including a pair of a rank 2 codeword indices with respect to the reference rank of 3 and two rank 1 best companion PMIs may be obtained based on combinations of best companion PMI candidates in Table 15, Table 16, Table 18, and/or Table 19. The table may also be obtained based on a combination of Table 15, 17, 18, and/or 19.

(2) reference rank=4

Even when the reference rank is 4, the best companion PMI candidates with respect to the rank 2 codeword may be expressed using codewords of the rank 1 codebook.

TABLE 20

|  | Rank 2 codeword index | | | |
| --- | --- | --- | --- | --- |
|  | 1 | 2 | 3 | 4 |
| Codeword index of rank 1 codebook same as second column of rank 2 codeword | 11 | 10 | 11 | 12 |
| Best companion PMI candidate 1 in rank 1 codebook | 12, 9, 11 | 9, 11, 12 | 12, 9, 10 | 9, 10, 11 |

TABLE 21

|  | Rank 2 codeword index | | | |
| --- | --- | --- | --- | --- |
|  | 5 | 6 | 7 | 8 |
| codeword index of rank 1 codebook same as second column of rank 2 codeword |  |  | 5 | 6 |
| best companion PMI candidate 1 in rank 1 codebook | 1, 5, 7 | 2, 6, 8 | 6, 7, 8 | 7, 8, 5 |
| best companion PMI candidate 2 in rank 1 codebook | 2, 5, 7 | 3, 6, 8 |  |  |
| best companion PMI candidate 3 in rank 1 codebook | 9, 5, 7 | 10, 6, 8 |  |  |
| best companion PMI candidate 4 in rank 1 codebook | 10, 5, 7 | 11, 6, 8 |  |  |
| Best companion PMI candidate 5 in rank 1 codebook | 11, 5, 7 | 13, 6, 8 |  |  |
| Best companion PMI candidate 6 in rank 1 codebook | 12, 5, 7 | 16, 6, 8 |  |  |

TABLE 22

|  | Rank 3 codeword index | | | |
| --- | --- | --- | --- | --- |
|  | 9 | 10 | 11 | 12 |
| Codeword index of rank 1 codebook same as second column of rank 2 codeword | 1 | 4 | 9 | 10 |

TABLE 22-continued

| | Rank 3 codeword index | | | |
|---|---|---|---|---|
| | 9 | 10 | 11 | 12 |
| Best companion PMI candidate 1 in rank 1 codebook | 2, 3, 4 | 1, 2, 3 | 10, 11, 12 | 9, 11, 12 |

TABLE 23

| | Rank 2 codeword index | | | |
|---|---|---|---|---|
| | 13 | 14 | 15 | 16 |
| Codeword index of rank 1 codebook same as second column of rank 2 codeword | 14 | 16 | 13 | 15 |
| best companion PMI candidate 1 of rank 1 codebook | 13, 15, 16 | 13, 14, 15 | 14, 15, 16 | 16, 13, 14 |

A table including a pair of rank 2 codeword indices with respect to the reference rank of 4 and three rank 1 best companion PMIs may be obtained based on combinations of Table 20 through Table 23.

A best companion CQI with respect to a case in which the preferred rank of the terminal is 2 may be calculated similarly as in Equation 1.

<Best Companion PMI Determining Method 2>

In the method 2, the best companion PMI may be determined based on a codebook corresponding to a reference rank.

1. preferred rank of terminal=1

The terminal may select a PMI from the rank 1 codebook. With respect to a given reference rank, codewords with respect to the best companion PMI may be determined based on columns of a pre-coding matrix that have a codeword with respect to the PMI selected by the terminal, as a first column. For example, the pre-coding matrix may be included in a codebook corresponding to the reference rank.

(1) reference rank=2

A second column of a codeword with respect to a rank 2 PMI that has an index that is the same as the rank 1 PMI selected by the terminal may be the best companion PMI. As described herein, a first column of the codeword with respect to the rank 1 PMI may be the same as the codeword with respect to the rank 1 PMI selected by the terminal. Accordingly, the rank 1 PMI selected by the terminal may be orthogonal to the best companion PMI, examples of which are organized in Table 24 and Table 25.

TABLE 24

| | Rank 1 codeword index | | | | | | | |
|---|---|---|---|---|---|---|---|---|
| | 1 | 2 | 3 | 4 | 5 | 6 | 7 | 8 |
| second column of rank 2 codeword corresponding to corresponding index is codeword with respect to best companion PMI | 1 | 2 | 3 | 4 | 5 | 6 | 7 | 8 |

TABLE 25

| | Rank 1 codeword index | | | | | | | |
|---|---|---|---|---|---|---|---|---|
| | 9 | 10 | 11 | 12 | 13 | 14 | 15 | 16 |
| second column of rank 2 codeword corresponding to corresponding index is codeword with respect to best companion PMI | 9 | 10 | 11 | 12 | 13 | 14 | 15 | 16 |

(2) reference rank=3

A second column and a third column of a codeword with respect to a rank 3 PMI that has an index that is same as the rank 1 PMI may be the best companion PMIs, examples of which are organized in Table 26 and Table 27.

TABLE 26

| | Rank 1 codeword index | | | | | | | |
|---|---|---|---|---|---|---|---|---|
| | 1 | 2 | 3 | 4 | 5 | 6 | 7 | 8 |
| second and third columns of codeword of rank 3 corresponding to corresponding index are codewords with respect to best companion PMI | 1 | 2 | 3 | 4 | 5 | 6 | 7 | 8 |

TABLE 27

| | Rank 1 codeword index | | | | | | | |
|---|---|---|---|---|---|---|---|---|
| | 9 | 10 | 11 | 12 | 13 | 14 | 15 | 16 |
| second and third columns of codeword of rank 3 corresponding to corresponding index are codewords with respect to best companion PMI | 9 | 10 | 11 | 12 | 13 | 14 | 15 | 16 |

(2) reference rank=4

A second column, a third column, and a fourth column of a codeword with respect to a rank 4 PMI that has an index that is the same as the rank 1 PMI may be the best companion PMIs, examples of which are organized in Table 28 and Table 29.

TABLE 28

| | Rank 1 codeword index | | | | | | | |
|---|---|---|---|---|---|---|---|---|
| | 1 | 2 | 3 | 4 | 5 | 6 | 7 | 8 |
| second, third, fourth columns of codeword of rank 4 corresponding to corresponding index are codewords with respect to best companion PMI | 1 | 2 | 3 | 4 | 5 | 6 | 7 | 8 |

TABLE 29

| | Rank 1 codeword index | | | | | | | |
|---|---|---|---|---|---|---|---|---|
| | 9 | 10 | 11 | 12 | 13 | 14 | 15 | 16 |
| second, third, fourth column of codeword of rank 4 corresponding to corresponding index are codewords with respect to best companion PMI | 9 | 10 | 11 | 12 | 13 | 14 | 15 | 16 |

2. preferred rank of terminal=2

When the preferred rank of terminal is 2, and codewords with respect to best companion PMIs are orthogonal to a column of a codeword that has a highest CQI in an SU-MIMO report, the best companion CQI may describe a CQI of a layer corresponding to the column of the codeword having the highest CQI in the SU-MIMO report.

(1) reference rank=2

In some examples, the best companion CQI and an SU-MIMO CQI may overlap each other and may provide the same information. Therefore, the terminal may not feed back an additional best companion CQI.

(2) reference rank=3

Two best companion PMIs to be used for calculating the best companion CQI may be defined with respect to each rank 2 SU-MIMO PMI.

A first best companion PMI may correspond to a column of a codeword with respect to a rank 2 SU-MIMO PMI having a lowest CQI.

A second best companion PMI may correspond to a column that is different from a codeword with respect to the rank 2 SU-MIMO PMI from among columns of a rank 3 PMI that have the same index as the rank 2 SU-MIMO PMI.

Examples of which are organized in Table 30 and Table 31.

TABLE 30

| | Rank 2 codeword index | | | | | | | |
|---|---|---|---|---|---|---|---|---|
| | 1 | 2 | 3 | 4 | 5 | 6 | 7 | 8 |
| best companion PMI corresponds to column that is excluded from rank 2 PMI among columns of codeword with respect to rank 3 PMI | 1 | 2 | 3 | 4 | 5 | 6 | 7 | 8 |

TABLE 31

| | Rank 2 codeword index | | | | | | | |
|---|---|---|---|---|---|---|---|---|
| | 9 | 10 | 11 | 12 | 13 | 14 | 15 | 16 |
| best companion PMI corresponds to column that is excluded from rank 2 PMI among columns of codeword with respect to rank 3 PMI | 9 | 10 | 11 | 12 | 13 | 14 | 15 | 16 |

(3) reference rank=4

As yet another example, three best companion PMIs to be used for calculating the best companion CQI may be defined for each rank 2 SU-MIMO PMI.

A first best companion PMI may correspond to a column of a codeword with respect to a rank 2 SU-MIMO PMI that has a lowest CQI.

A second best companion PMI and a third best companion PMI may correspond to columns that are different from a codeword with respect to the rank 2 SU-MIMO PMI from among columns of a rank 4 PMI that have an index that is the same as the rank 2 SU-MIMO PMI.

Example of which are organized in Table 32 and Table 33.

TABLE 32

| | Rank 2 codeword index | | | | | | | |
|---|---|---|---|---|---|---|---|---|
| | 1 | 2 | 3 | 4 | 5 | 6 | 7 | 8 |
| best companion PMI corresponds to columns that are excluded from rank 2PMI among columns of codeword with respect to rank 4 PMI | 1 | 2 | 3 | 4 | 5 | 6 | 7 | 8 |

TABLE 33

| | Rank 2 codeword index | | | | | | | |
|---|---|---|---|---|---|---|---|---|
| | 9 | 10 | 11 | 12 | 13 | 14 | 15 | 16 |
| best companion PMI corresponds to columns that are excluded from rank 2 PMI among columns of codeword with respect to rank 4 PMI | 9 | 10 | 11 | 12 | 13 | 14 | 15 | 16 |

<A Case in which a Base Station includes Eight Antennas (8Tx)>

If the base station includes eight antennas, the foregoing methods may be applied based on an LTE-A codebook. Codebooks to be used when the base station includes eight antennas may be provided as shown in Table 34 through Table 41. In this example, $$\phi_n = e^{j\pi n/2} \text{ and } v_m = [1 \ e^{j2\pi m/32} \ e^{j4\pi m/32} \ e^{j6\pi m/32}]^T$$

TABLE 34

| | $i_2$ | | | | | | | |
|---|---|---|---|---|---|---|---|---|
| $i_1$ | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \dfrac{1}{\sqrt{8}} \begin{bmatrix} v_m \\ \varphi_n v_m \end{bmatrix}$ Table 34 is an example of a codebook for 1-layer CSI feedback.

TABLE 35

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$ Table 35 is an example of a codebook for 2-layer CSI feedback

TABLE 36

| $i_1$ | $i_2$ | | | |
|---|---|---|---|---|
| | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ | | | |
|---|---|---|---|---|
| | 4 | 5 | 6 | 7 |
| 0-3 | $W_{8i_1+2,8i_1+2,4i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ | | | |
|---|---|---|---|---|
| | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | | |
|---|---|---|---|---|
| | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$ Table 36 is an example of a codebook for 3-layer CSI feedback.

TABLE 37

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Table 37 is an example of a codebook for 4-layer CSI.

TABLE 38

| $i_1$ | $i_2$ |
|---|---|
| | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 38 is an example of a codebook for 5-layer CSI feedback.

TABLE 39

| $i_1$ | $i_2$ |
|---|---|
| | 0 |
| 0-3 | $W_{i_1}^{(6)} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 39 is an example of a codebook for 6-layer CSI feedback.

TABLE 40

| $i_l$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 40 is an example of codebook for 7-layer CSI feedback

TABLE 41

| $i_l$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Table 41 is an example of a codebook for 8-layer CSI feedback.

A table indicating a mapping relation between a codeword index and a best companion PMI may be obtained based on the codebook. For example, the tables may be obtained based on the best companion PMI determining method 1 and method 2 in the example in which the base station includes four antennas.

<Best Companion PMI Determining Method 1>

1. preferred rank of terminal=1

Best companion PMI candidates to be used for calculating a best companion CQI may be defined for each rank 1 SU-MIMO PMI and may be determined as follows.

(1) reference rank=2

Two options may exist.

With respect to an i2 entry that is fixed and that is the same as an i2 index as a rank 1 SU-MIMO report, i1 entry candidates that enable a best companion W to be orthogonal to a rank 1 SU-MIMO PMI W are organized in table 42

TABLE 42

| | Codeword index i1 |
|---|---|
| | i1 |
| Best Companion index candidate 1 | mod(i1 + 4, 16) |
| Best Companion index candidate 2 | mod(i1 + 8, 16) |
| Best Companion index candidate 3 | mod(i1 + 12, 16) |

With respect to an i1 entry that is fixed and that is the same as an i1 index as the rank 1 SU-MIMO report, i2 entry candidates that enable the best companion W to be orthogonal to the rank 1 SU-MIMO PMI W are organized in Table 43.

TABLE 43

| | Codeword index i2 |
|---|---|
| | i2 |
| Best Companion index candidate 1 | mod(i2 + 2, 4) |
| Best Companion index candidate 2 | mod(i2 + 2, 4) + 4 |
| Best Companion index candidate 3 | mod(i2 + 2, 4) + 8 |
| Best Companion index candidate 4 | mod(i2 + 2, 4) + 12 |

(2) reference rank=3

Two preferred best companion PMIs to be used for calculating a CQI may be defined with respect to each rank 1 SU-MIMO PMI as shown in Table 44.

TABLE 44

| | Codeword index i1 |
|---|---|
| | i1 |
| Best Companion index candidate 1 | mod(i1 + 4, 16), mod(i1 + 8, 16) |
| Best Companion index candidate 2 | mod(i1 + 8, 16), mod(i1 + 12, 16) |
| Best Companion index candidate 3 | mod(i1 + 12, 16), mod(i1 + 4, 16) |

(3) reference rank=4

Three preferred best companion PMIs to be used for calculating the CQI may be defined with respect to each rank 1 SU-MIMO PMI as shown in Table 45.

TABLE 45

| | Codeword index i1 |
|---|---|
| | i1 |
| Best Companion index candidate 1 | mod(i1 + 4, 16), mod(i1 + 8, 16), mod(i1 + 12, 16) |

—Power Allocation—

When a terminal calculates the CQI, it is assumed that the terminal allocates different amounts of power to each codeword. For example, if the reference rank is equal to 4, it may be assumed that the terminal allocates 1/2 total power to the rank 1 SU-MIMO PMI, and allocates 1/6 total power to each of remaining best companion PMIs. Examples of candidates for power allocation may be as follows.

[power of rank 1 SU-MIMIO PMI/power of best companion PMI/power of best companion PMI/power of best companion PMI]=[1/2/1/6/1/6/1/6] or [1/2/1/2/0/0] or [1/2/0/1/2/0] or [1/2/0/0/1/2] or [1/4/1/4/1/4/1/4]

Feedback Mechanism using Physical Uplink Shared Channel (PUSCH)

Examples of extensions of PUSCH modes for feedback of the best companion CQI are described. In various examples, extension of PUSCH modes for a case in which a reference rank is greater than a preferred rank of the terminal, are described.

(1) Extension of PUSCH 1-2

A plurality of subband PMIs corresponding to different subbands, a wideband CQI for each layer, and at least one wideband best companion CQI may be fed back using the same sub-frame.

(2) Extension of PUSCH 3-1

As a first option, a wideband PMI, a wideband CQI for each layer, a plurality of differential sub-band CQIs associated with a wideband CQI (the respective differential sub-band CQIs corresponding to different layers and different subbands), an optional best companion wideband CQI for each layer, and differential best companion sub-band CQIs for each sub-band (the differential best companion sub-band CQIs associated with a wideband CQI or a best companion wideband CQI) may be fed back using the same sub-frame.

A second option may be used to reduce overhead. For example, a wideband PMI, a wideband CQI for each layer, an optional best companion wideband for each layer, differential best companion sub-band CQIs for each sub-band (best companion sub-band CQIs associated with a wideband CQI or a best companion wideband CQI) may be fed back using the same sub-frame.

(3) Extension of PUSCH 2-2

As a first option, a wideband PMI, a wideband CQI for each layer, an optional best companion wideband for each layer, a sub-band PMI selected for best sub-bands, a differential CQI for each layer with respect to best subbands, a plurality of differential best companion sub-band CQIs with respect to the best sub-bands (differential best companion sub-band CQI associated with a wideband CQI or a best companion wideband CQI) may be fed back using the same sub-frame.

A second option may be used to reduce overhead. For example, a wideband PMI, a wideband CQI for each layer, an optional best companion wideband CQI for each layer, a sub-band PMI selected with respect to best sub-bands, a plurality of differential best companion sub-band CQIs with respect to the best subbands (differential best companion sub-band CQI associated with a wideband CQI or a best companion wideband CQI) may be fed back using the same sub-frame.

(4) Extension of PUSCH 3-2

As a first option, a plurality of sub-band PMIs corresponding to different sub-bands, a wideband CQI for each layer, an optional best companion wideband for each layer, a plurality of differential sub-band CQIs associated with a wideband CQI (respective differential sub-band CQIs corresponding to different codewords and different sub-bands), and differential best companion sub-band CQIs for each sub-band (differential best companion sub-band CQI associated with a wideband CQI or a best companion wideband CQI) may be fed back using the same sub-frame.

A second option may be used to reduce overhead. For example, a plurality of sub-band PMIs corresponding to different sub-bands, a wideband CQI for each layer, a best companion wideband CQI for each layer, differential best companion sub-band CQIs for each sub-band (differential best companion sub-band CQI associated with a wideband CQI or a best companion wideband CQI) may be fed back using the same sub-frame.

Extension of PUSCH modes for a rank restricted feedback, that is, extension of PUSCH modes for a case in which a reference rank is less than a preferred rank of a terminal, is described as follows. A wideband restricted PMI feedback is described as an example.

(1) Extension of PUSCH 1-2

As a first option, a plurality of sub-band PMIs corresponding to different sub-bands, a wideband CQI for each layer, a plurality of rank restricted PMIs respectively corresponding to different sub-bands, and a restricted wideband CQI for each layer may be fed back using the same sub-frame.

A second option may be used to reduce overhead. For example, a plurality of sub-band PMIs corresponding to different sub-bands, a wideband CQI for each layer, a wideband rank restricted PMI, and a restricted wideband CQI for each codeword may be fed back using the same sub-frame.

(2) Extension of PUSCH 3-1

A wideband PMI, a wideband CQI for each layer, a plurality of differential sub-band CQIs associated with a wideband CQI (respective differential sub-band CQI corresponding to different layers and different sub-bands), a rank restricted wideband PMI, a rank restricted wideband CQI for each layer, and a plurality of differential rank restricted CQIs associated with a rank restricted wideband CQI (the respective differential rank restricted sub-band CQIs corresponding to different layers and different sub-bands) may be fed back using the same sub-frame.

(3) Extension of PUSCH 2-2

A first option, a wideband PMI, a wideband CQI for each layer, a sub-band PMI selected with respect to best sub-bands, a differential CQI for each layer with respect to the best sub-bands, a rank restricted wideband PMI, a rank restricted wideband CQI for each layer, a rank restricted sub-band PMI selected with respect to the best sub-bands, and a rank restricted differential CQI for each layer with respect to the best sub-bands may be fed back using the same sub-frame.

As a second option, a wideband PMI, a wideband CQI for each layer, a sub-band PMI selected with respect to best sub-bands, a differential CQI for each layer with respect to the best sub-bands, a rank restricted wideband PMI, a rank restricted wideband for each layer, a rank restricted wideband CQI for each layer, and a rank restricted differential CQI for each layer with respect to the best sub-bands may be fed back using the same sub-frame.

(4) Extension of PUSCH 3-2

As a first option, a plurality of sub-band PMIs corresponding to different sub-bands, a wideband CQI for each layer, a plurality of differential sub-band CQIs associated with a wideband CQI (the respective differential sub-band CQIs corresponding to different codewords and different sub-bands), a plurality of rank restricted sub-band PMIs (respective rank restricted sub-band PMIs corresponding to different layers and different sub-bands), a plurality of rank restricted sub-band PMIs corresponding to different layers and different sub-bands, a rank restricted wideband CQI for each layer, and a plurality of rank restricted differential sub-band CQIs associated with a rank restricted wideband CQI (respective rank restricted differential sub-band CQIs corresponding to different layers and different sub-bands) may be fed back using the same sub-frame.

As a second option, a plurality of sub-band PMIs corresponding to different sub-bands, a wideband CQI for each layer, a plurality of differential sub-band CQI being associated with a wideband CQI (the respective differential sub-band CQIs corresponding to different layers and different sub-bands), a rank restricted wideband PMI, a single rank restricted wideband CQI for each layer, and a plurality of rank restricted differential sub-band CQIs associated with a rank restricted wideband CQI (respective rank restricted differential sub-band CQIs corresponding to different layers and different sub-bands) may be fed back using the same sub-frame.

Figure 4:
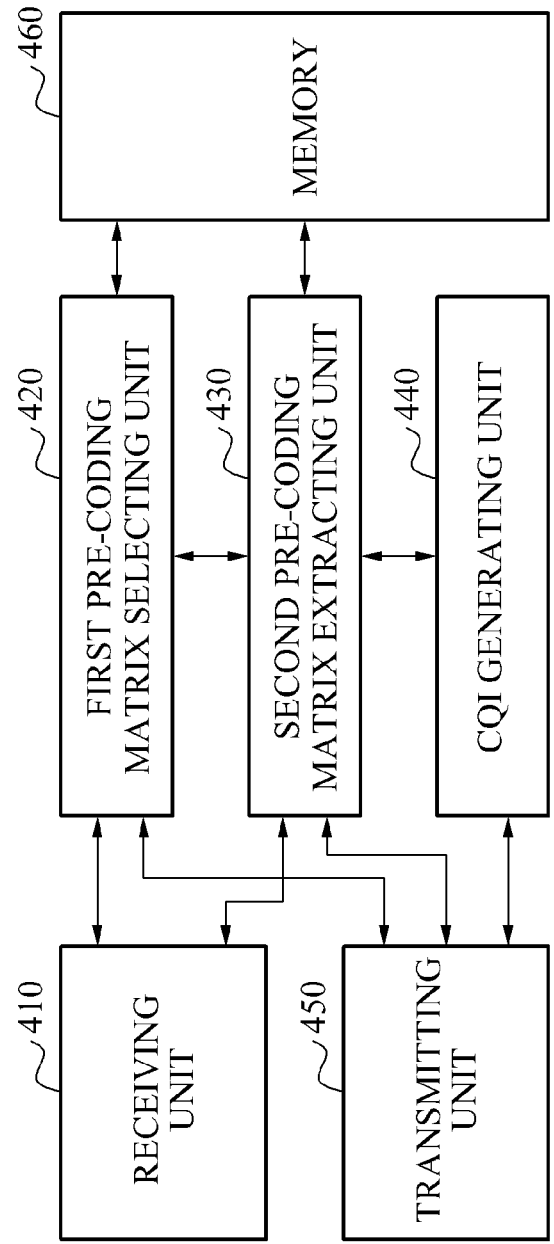
FIG. 4 is a diagram illustrating an example of a terminal in an MIMO communication system including a base station and the terminal.

FIG. 4 illustrates an example of a terminal in a MIMO communication system including a base station and the terminal.

Referring to FIG. 4, the terminal includes a receiving unit 410, a first pre-coding matrix selecting unit 420, a second pre-coding matrix extracting unit 430, a CQI generating unit 440, a transmitting unit 450, and a memory 460.

The receiving unit 410 may receive a reference rank that is determined by the base station.

The first pre-coding matrix selecting unit 420 may select, based on a preferred rank of the terminal, a preferred first pre-coding matrix for the terminal. The preferred first pre-coding matrix may be a codeword with respect to an SU-MIMO PMI of the terminal. The first pre-coding matrix selecting unit 420 may select the preferred first pre-coding matrix for the terminal based on a codebook corresponding to the preferred rank of the terminal.

The second pre-coding matrix extracting unit 430 may extract, based on a reference rank and the preferred rank of the terminal, at least one preferred second pre-coding matrix. The at least one preferred second pre-coding matrix may be a codeword with respect to a best companion PMI, for at least one neighboring terminal corresponding to the preferred first pre-coding matrix. For example, the second pre-coding matrix extracting unit 430 may calculate a rank for the at least one neighboring terminal, based on the reference rank and the preferred rank of the terminal, and may extract the at least one preferred second pre-coding matrix based on the rank for the at least one neighboring terminal.

In various examples, the second pre-coding matrix extracting unit 430 may extract the at least one preferred second pre-coding matrix based on a codebook corresponding to the preferred rank of the terminal or a codebook corresponding to the reference rank.

As another example, the second pre-coding matrix extracting unit 430 may extract the at least one preferred second pre-coding matrix, based on a table that is defined in advance and that includes pairs of first pre-coding matrix candidates and second pre-coding matrix candidates.

The CQI generating unit 440 may generate at least one channel quality indicator (CQI), that is, at least one best companion CQI, of the terminal, based on the preferred first pre-coding matrix and the at least one preferred second pre-coding matrix. For example, the CQI generating unit 440 may generate the at least one CQI based on interference due to the at least one preferred second pre-coding matrix.

The transmitting unit 450 may feed back, to the base station, the at least one CQI generated by the CQI generating unit 440.

The memory 460 may store the table that is defined in advance and that includes the pairs of the preferred first pre-coding matrix candidates and the second pre-coding matrix candidates. The memory 460 may store various codebooks.

As another example, the terminal may include a controller (not shown) that performs one or more functions of the receiving unit 410, the first pre-coding matrix 420, the second pre-coding matrix 430, the CQI generating unit 440, the transmitting unit 450, and the memory 460. For example, the controller may determine information to feedback to the base station based on the preferred rank and the reference rank.

Figure 5:
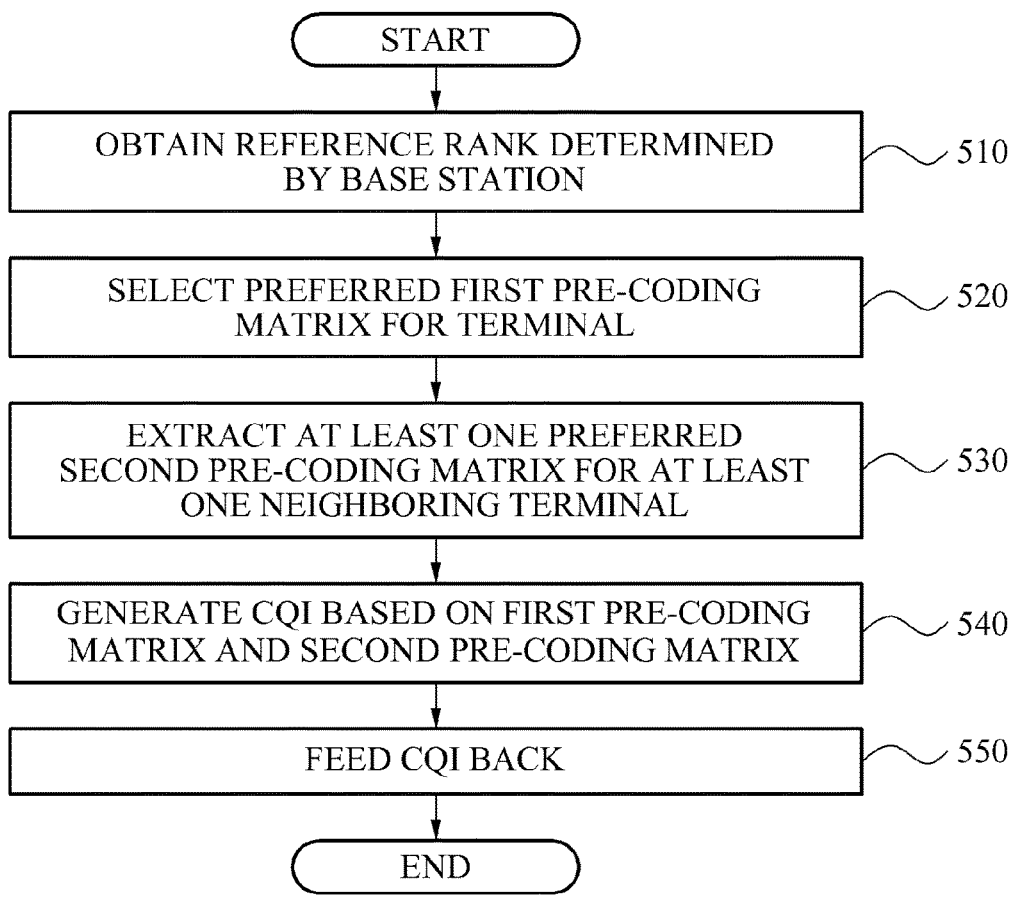
FIG. 5 is a flowchart illustrating a communication method of a terminal in an MIMO communication system including a base station and the terminal.

FIG. 5 illustrates an example of a communication method of a terminal in an MIMO communication system including a base station and the terminal.

Referring to FIG. 5, the terminal obtains a reference rank determined by the base station, in 510.

The terminal selects a preferred first pre-coding matrix for the terminal, based on a preferred rank of the terminal, in 520.

The terminal may extract, based on the reference rank and the preferred rank of the terminal, at least one preferred second pre-coding matrix for at least one neighboring terminal corresponding to the preferred first pre-coding matrix, in 530. The at least one preferred second pre-coding matrix may be a codeword with respect to a best companion PMI of the terminal. The preferred first pre-coding matrix may be a codeword with respect to an SU-MIMO PMI of the terminal. In this example, the terminal may extract the at least one preferred second pre-coding matrix that is orthogonal to the preferred first pre-coding matrix.

The terminal may select a codeword corresponding to the preferred first pre-coding matrix from a plurality of codewords included in a codebook corresponding to the reference rank, and may determine the at least one preferred second pre-coding matrix based on the selected codeword. For example, remaining columns excluding a column included in the preferred first pre-coding matrix from columns included in the selected codeword may be selected as the at least one second pre-coding matrix.

The terminal generates the at least one CQI, that is, the at least one best companion CQI, of the terminal, based on the preferred first pre-coding matrix and the at least one preferred second pre-coding matrix, in 540.

The terminal feeds back the at least one CQI back to the base station, in 550.

A communication method of the terminal has been described. It should be appreciated that the examples described with reference to FIGS. 1 through 4 are applicable to the communication method of the terminal shown in FIG. 5.

In various examples herein, the rank may refer to the number of data streams to be used to transmit data from a base station to a terminal.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a terminal in a multiple-input multiple-output (MIMO) communication system including a base station and the terminal, the method comprising:
    transmitting, from the terminal, information for rank restricted feedback to the base station using an extension of a physical uplink shared channel (PUSCH),
    wherein the information comprises a wideband rank-restricted pre-coding matrix indicator (PMI) and no subband rank-restricted PMI, and
    wherein a restricted rank of the wideband rank-restricted PMI is less than a reference rank determined by the base station, and a preferred rank of the terminal is greater than or equal to the reference rank.

2. The method of claim 1, wherein a subframe of the information includes:
    multiple subband PMI, the multiple subband PMI comprising one subband PMI per subband,
    one wideband channel quality indicator (CQI) per codeword,
    multiple rank-restricted PMI, the multiple rank-restricted PMI comprising one rank-restricted PMI per subband, and
    one rank-restricted wideband CQI per codeword.

3. The method of claim 1, wherein a subframe of the information includes:
    multiple subband PMI, the multiple subband PMI comprising one subband PMI per subband,
    one wideband CQI per codeword,
    one wideband rank-restricted PMI, and
    one rank-restricted wideband CQI per codeword.

4. The method of claim 1, wherein a subframe of the information includes:
    one wideband PMI,
    one wideband CQI per codeword,
    multiple differential subband CQI with respect to the wideband CQI, the multiple differential subband CQI comprising one differential subband CQI per subband and per codeword,
    one rank-restricted wideband PMI,
    one rank-restricted wideband CQI per codeword, and
    multiple differential rank-restricted subband CQI with respect to the rank-restricted wideband CQI, the multiple differential rank-restricted subband CQI comprising one differential rank-restricted subband CQI per subband and per codeword.

5. The method of claim 1, wherein a subframe of the information includes:
    one wideband PMI,
    one wideband CQI per codeword,
    one subband PMI selected over the best subbands,
    one differential CQI per codeword, the differential CQI being over the best subbands,
    one rank-restricted wideband PMI,
    one rank-restricted wideband CQI per codeword,
    one rank-restricted subband PMI selected over the best subbands, and
    one rank-restricted differential CQI per codeword, the rank-restricted differential CQI being over the best subbands.

6. The method of claim 1, wherein a subframe of the information includes:
    one wideband PMI,
    one wideband CQI per codeword,
    one subband PMI selected over the best subbands,
    one differential CQI per codeword, the differential CQI being over the best subbands,
    one rank-restricted wideband PMI,
    one rank-restricted wideband CQI per codeword, and
    one rank-restricted differential CQI per codeword, the rank-restricted differential CQI being over the best subbands.

7. The method of claim 1, wherein a subframe of the information includes:
    multiple subband PMI, the multiple subband PMI comprising one subband PMI per subband,
    one wideband CQI per codeword,
    multiple differential subband CQI with respect to the wideband CQI, the multiple differential subband CQI comprising one differential subband CQI per subband and per codeword,
    multiple rank-restricted subband PMI, the multiple rank-restricted subband PMI comprising one rank-restricted subband PMI per subband,
    one rank-restricted wideband CQI per codeword, and
    multiple rank-restricted differential subband CQI with respect to the rank-restricted wideband CQI, the multiple rank-restricted differential subband CQI comprising one rank-restricted differential subband CQI per subband and per codeword.

8. The method of claim 1, wherein a subframe of the information includes:
- multiple subband PMI (one per subband),
- one wideband CQI per codeword,
- multiple differential subband CQI with respect to the wideband CQI, the multiple differential subband CQI comprising one differential subband CQI per subband and per codeword,
- one rank-restricted wideband PMI,
- one rank-restricted wideband CQI per codeword, and
- multiple rank-restricted differential subband CQI with respect to the rank-restricted wideband CQI, the multiple rank-restricted differential subband CQI comprising one rank-restricted differential subband CQI per subband and per codeword.

9. A non-transitory computer readable recording medium storing a program to cause a computer to implement the method of claim 1.

* * * * *